(12) United States Patent
Walworth et al.

(10) Patent No.: US 8,148,476 B2
(45) Date of Patent: Apr. 3, 2012

(54) SLURRY PHASE POLYMERISATION

(75) Inventors: Brent R. Walworth, Sint-Niklaas (BE); Marc J. G. Parisel, Vilvoorde (BE)

(73) Assignee: Ineos Manufacturing Belgium NV, Antwerpen (BE)

( * ) Notice: Subject to any disclaimer, the term of this patent is extended or adjusted under 35 U.S.C. 154(b) by 220 days.

(21) Appl. No.: 12/451,362

(22) PCT Filed: May 13, 2008

(86) PCT No.: PCT/EP2008/055810
§ 371 (c)(1),
(2), (4) Date: Nov. 9, 2009

(87) PCT Pub. No.: WO2008/141965
PCT Pub. Date: Nov. 27, 2008

(65) Prior Publication Data
US 2011/0224388 A1    Sep. 15, 2011

(30) Foreign Application Priority Data
May 18, 2007    (EP) ..................................... 07252047

(51) Int. Cl.
*C08F 2/00*    (2006.01)
*B01J 10/00*    (2006.01)
*B01J 19/18*    (2006.01)

(52) U.S. Cl. ................ 526/64; 526/65; 526/67; 526/70; 422/129; 422/132

(58) Field of Classification Search .................... 526/64, 526/65, 67, 70; 422/129, 132
See application file for complete search history.

(56) References Cited

U.S. PATENT DOCUMENTS

2001/0018499 A1    8/2001    Marissal et al.
2001/0018500 A1*   8/2001    Marissal et al. ................. 526/70

FOREIGN PATENT DOCUMENTS

EP    1 415 999 A1    5/2004

OTHER PUBLICATIONS

International Preliminary Report on Patentability; PCT International Application No. PCT/EP2008/055810; PCT International Filing Date May 13, 2008 (10 pgs).

* cited by examiner

*Primary Examiner* — William Cheung
(74) *Attorney, Agent, or Firm* — Nixon & Vanderhye (57) ABSTRACT

Process for transferring a slurry stream containing polymer through a transfer line from a polymerisation reactor to a downstream vessel by, prior to entry into the downstream vessel, separating the slurry stream into two flows, the first flow being recycled upstream of the flow separation and the second flow being passed into the downstream vessel. The flow separation is located more than halfway along the transfer line between the reactor and the downstream vessel.

27 Claims, 2 Drawing Sheets

SLURRY PHASE POLYMERISATION

This application is the U.S. national phase of International Application No. PCT/EP2008/055810 filed 13 May 2008 which designated the U.S. and claims priority to European Application No. 07252047.1 filed 18 May 2007, the entire contents of each of which are hereby incorporated by reference.

The present invention is concerned with a means of transferring slurry phase olefin polymers.

BACKGROUND OF THE INVENTION

Slurry phase polymerisation of olefins is very well known, wherein an olefin monomer and optionally olefin comonomer are polymerised in the presence of a catalyst in a diluent in which the solid polymer product is suspended and transported. Two or more reactors are typically used in such polymerisations when it is desired to produce a multimodal product, in which a polymer made in a first reactor is transferred to a second reactor, where a second polymer having different properties to the first polymer is made in the presence of the first. However it may also be desirable to connect two reactors making monomodal polymers in order to create a swing monomodal/multimodal plant or to increase the flexibility of two small reactors that individually may lack the scale to be economically viable.

Slurry phase polymerisations are typically carried out at temperatures in the range 50-125° C. and at pressures in the range 1-100 bara. The catalyst used can be any catalyst typically used for olefin polymerisation such as chromium oxide, Ziegler-Natta or metallocene-type catalysts. The product slurry, comprising polymer and diluent and in most cases also catalyst, olefin monomer and comonomer can be discharged from each reactor intermittently or continuously, optionally using concentrating devices such as hydrocyclones or settling legs to minimise the quantity of fluids withdrawn with the polymer.

There are various options for transferring the active polymer slurry from one reactor to another. However, particularly in the case where the polymers being made in each reactor are different, the transfer is often difficult because it is desirable to control the polymerisation mixture in each reactor independently and therefore to remove from the stream exiting the first reactor any component that is undesirable in the second reactor. Several methods have been disclosed in the literature to operate such a transfer. For example, US 2001/0018499 describes a process in which most of the hydrogen present in the first reactor is removed by relieving the pressure of the suspension before sending it to the second reactor. U.S. Pat. No. 5,639,834 describes a process wherein a comonomer-rich suspension formed in the first reactor is drawn off from this reactor by means of settling legs, and a concentrated suspension sent to the second reactor in which the amount of comonomer has been reduced. U.S. Pat. No. 4,692,501 describes a process in which the suspension formed in the first reactor is washed by a liquid counter-current in an exchange zone before being sent to the second reactor. US 2001/0018500 describes a continuous polymerisation process wherein a suspension of polyethylene particles, withdrawn from the first reactor, is sent to a hydrocyclone separator where it is separated into a concentrated suspension that is sent to the second reactor, and a stream comprising the diluent that is partially recycled to the first polymerisation zone. There is no disclosure of the exact location of the hydrocyclone separator in the line between the first and second reactors.

However an additional problem with such transfers relates to fouling of or sedimentation in the transfer line between the two reactors under the wide range of flow conditions for which the line needs to be designed. The risk of such problems occurring is generally dependent on the velocity of the polymer-containing slurry and the associated pressure drop through the transfer line between the reactors, which depends on the line dimensions and configuration as well as the type of slurry being transferred. In large plants, where it may be desired to connect two reactors which are separated by a significant distance, the transfer line may have to be relatively long such that the effect of variations in pressure drop under differing transfer flows is increased. As a result, careful design of the transfer line between the reactors is required in order to maintain reliable polymer flow across the full range of desired operating conditions.

One solution to the above problem is to increase the velocity of the stream by using a smaller diameter line. But this can lead to an unacceptably high pressure drop along the line. We have found that the problems with sedimentation and fouling in the transfer line between a polymerisation reactor and a downstream vessel, particularly a second reactor, can be reduced by an arrangement in which the length of the transfer line through which the flow-rate of the slurry is the same as that entering the downstream vessel is minimised.

SUMMARY OF THE INVENTION

Accordingly in a first aspect the invention provides a process for transferring a slurry stream containing polymer through a transfer line from a polymerisation reactor to a downstream vessel, wherein prior to entry into the downstream vessel the slurry stream is separated into two flows, the first flow being recycled upstream of the flow separation and the second flow being passed into the downstream vessel, wherein the flow separation is located more than halfway along the transfer line between the reactor and the downstream vessel.

Usually the downstream vessel is a second polymerisation reactor, and it is also preferred that the first flow is recycled upstream of the flow separation by being passed back into the first reactor. However if the first reactor is one of a number of reactors in series, the first flow may be recycled back to an earlier reactor in the series.

It is of course a consequence of the above arrangement that the mass flow rate of the slurry entering the downstream vessel is lower than that leaving the first reactor, as part of the flow has been diverted to be recycled upstream. We have found that by employing a higher mass flow rate in the majority of the line and then reducing it—by the partial flow diversion—to the desired rate prior to entry into the downstream vessel, it is possible to operate the portion of the transfer line upstream of the flow diversion at a sufficiently high flow rate to avoid or at least significantly reduce fouling and/or agglomeration. Correspondingly, the portion of the transfer line operating at a relatively low flow-rate where fouling and/or sedimentation problems may be significant is minimised.

Locating the flow separation more than halfway along the transfer line between the reactor and the downstream vessel means that the length of the transfer line between the first reactor and the location of the flow separation is greater than that between the downstream vessel and the location of the flow separation, and thus in the passage of the polymer-containing slurry from the first reactor to the downstream vessel, the flow separation occurs after halfway. Accordingly less than half of the transfer line is subjected to the lower flow rate after the flow separation, which is where there is the greater risk of fouling or sedimentation.

It is preferred that the length of the transfer line between the first reactor and the location of the flow separation (ie upstream of the point of flow separation) is at least twice that between the downstream vessel and the location of the flow separation (ie downstream of the point of flow separation), such that the flow separation is effectively located two thirds of the way along the line. More preferably the flow separation occurs 80% of the way along the line, such that the length of the transfer line upstream of the point of flow separation is at least four times that downstream of the point of flow separation. Most preferred is that the length of the transfer line upstream of the flow separation is at least ten times that downstream the flow separation.

The main advantage of the invention is that the portion of the transfer line having a low flow rate and hence being at most risk of fouling can be minimised.

A further advantage of the invention is that whilst the flow rate downstream of the flow separation can be varied according to the required input into the downstream vessel, by corresponding variation of the amount of recycle flow it is possible to minimise the variation in the flow rate upstream of the flow separation; for example, if the input into the downstream vessel is required to increase, a corresponding reduction in the recycle flow could ensure that the upstream flowrate does not need to change. Accordingly in a preferred embodiment of the invention, the average flowrate over any 5 minute period upstream of the flow separation varies by less than 50%, preferably by less than 10%, in any 4 hour period, preferably in any 12 hour period.

It is also preferred that the average pressure drop over any 5 minute period between the first polymerisation reactor and the flow separation varies by less than 30%, preferably by less than 15% in any 4 hour period, preferably in any 12 hour period. In one embodiment of the invention the first flow is recycled back into the transfer line upstream of the flow separation instead of being passed back into the first reactor. This effectively creates a recycle loop having a residence time. Like the rest of the transfer line, this recycle loop may contain active polymer, and it is preferred that the polymer production in the recycle loop component of the transfer line is between 0.2 and 5% wt, preferably less than 2% wt of that in the polymerisation reactor. The average polymer residence time in the recycle loop, which is the mass of polymer in the recycle loop divided by the production rate, is preferably between 15 seconds and 20 minutes, and more preferably between 30 seconds and 5 minutes. The residence time may be lengthened by incorporating in the recycle loop a stirred tank, which may optionally be cooled. The recycle loop itself may be cooled and may have additional monomer added to it to maintain polymerisation activity. Usually no additional comonomer or chain transfer agents are added, which means that the continuing polymerisation in the recycle loop consumes that which is present, leading to a reduction in the concentration of these reagents. This is one benefit of incorporating such a recycle loop.

Accordingly a second aspect of the invention provides a process for transferring a slurry stream containing polymer through a transfer line from a first polymerisation reactor to a downstream vessel, wherein prior to entry into the downstream vessel the slurry stream is maintained under polymerisation conditions so as to reduce the concentration of at least one of the reagents present in the stream by at least 50 mol %, preferably at least 90 mol % whilst increasing the mass of the polymer present in the stream by no more than 5 wt %, preferably no more than 1 wt %, prior to introduction into the downstream, preferably polymerisation, vessel. It is also preferred in the first aspect of the invention that prior to entry into the downstream vessel the slurry stream is maintained under polymerisation conditions so as to reduce the concentration of at least one of the reagents present in the stream by at least 50 mol %, preferably at least 90 mol % whilst increasing the mass of the polymer present in the stream by no more than 5 wt %, preferably no more than 1 wt %, prior to introduction into the downstream, preferably polymerisation, vessel.

Preferably the polymerisation is maintained in an agitated vessel or a secondary loop: most preferably the polymerisation is maintained in an external recycle loop such as described above, which provides the required agitation and which optionally also includes cooling to remove the heat of polymerisation.

The residence time for the polymer produced in this aspect of the invention is preferably between 30 seconds and 20 minutes, and more preferably between 1 and 5 minutes.

Preferably the reagent whose concentration is reduced is a chain transfer agent or comonomer. It is also preferred that the polymerisation is carried out at a pressure of at least 90% of that in the first polymerisation reactor.

In a preferred embodiment of the invention, a solids concentrator, usually a centrifugal solids concentrator and most preferably a hydrocyclone is located at the point of flow separation in the transfer line. Where the solids concentrator is a hydrocyclone, the flow into the downstream vessel constitutes the base flow from the hydrocyclone, and the recycled flow upstream constitutes the overflow from the hydrocyclone. The function of the hydrocyclone is to concentrate the slurry stream, and it is the concentrated stream which passes to the downstream vessel whilst the excess diluent is recycled upstream, eg to the first reactor. This provides a means of reducing the concentration of the reagents and diluent from the polymerisation reactor in the feed to the downstream vessel: in the usual case where the downstream vessel is a second reactor, it is often desirable to independently control reaction conditions in each reactor system by having the ability to minimise crossover of reagents from one reactor to another. Where the downstream reactor is not a slurry phase reactor it is often also desirable to reduce the quantity of diluent introduced into it.

In another preferred embodiment of the present invention, a pump may be located in the transfer line upstream of the point of flow separation. This can permit an increase in the total length of the transfer line and/or an increased pressure in the second reactor. Alternatively the pump may be located in the recycle line, between the flow separation and the end of the recycle line.

A preferred type of reactor utilised for such polymerisations is a loop reactor, which is a continuous tubular construction comprising at least two, for example four, vertical sections and at least two, for example four horizontal sections. The heat of polymerisation is typically removed using indirect exchange with a cooling medium, preferably water, in jackets surrounding at least part of the tubular loop reactor. The volume of one loop reactor in a multiple reactor system can vary but is typically in the range 10-200 m$^3$. It is preferred that the polymerisation reactor utilised in the present invention is a loop reactor. In such a case, it is preferred that the slurry stream is drawn off from the loop reactor into the transfer line at a point downstream of the main pump in the loop, and that the first flow which is returned to the reactor enters the loop upstream of the pump.

A diluent inlet may be located downstream of the flow separation, particularly in the case where the downstream vessel is also a polymerisation reactor. This enables addition of further diluent in order to increase the rate of the flow into the second reactor if necessary, and also for use in the second reactor.

In one embodiment the flow separation is controlled by one or more valves located at the point of flow separation, which can adjust the relative rates of the two flows after the separation. A three-way valve is typically employed. The valve can if desired shut off completely either the flow to the second reactor or the recycled flow to the first reactor. If the flow to the second reactor is completely cut off at any time, additional diluent can be introduced through the inlet downstream of the separation to flush through any residual slurry.

Preferably the inlet to the downstream vessel is located at a lower elevation than the point of flow separation such that the flow from the point of flow separation into the downstream vessel is assisted by gravity.

The present invention is particularly useful in cases where the solids content of the slurry is above 20 vol %, particularly above 30 vol %, for example 20-40 vol %, where vol % is defined as [(total volume of the slurry−volume of the suspending medium)/(total volume of the slurry)]×100. It is in such cases that the risk of fouling or agglomeration in the transfer line is greatest.

It is important that the velocity of the slurry in the transfer line is above the minimum settling velocity for the slurry. Preferably the velocity of the slurry in the transfer line upstream of the flow separation is from 2 to 30 ms$^{-1}$, and more preferably from 5 to 15 ms$^{-1}$. Downstream of the flow separation the velocity is preferably from 6 to 20 ms$^{-1}$, and more preferably from 8 to 15 ms$^{-1}$. A high velocity causes a high pressure drop per unit length, which for long transfer lines obviously implies a high absolute pressure drop along the line. However one of the advantages of the present invention is that because the length of the transfer line downstream of the flow separation is relatively small, such high pressure drops and high velocities in that portion of the line are in fact possible because they require a relatively low absolute pressure drop across the whole line. This may not be possible if it were necessary to have such velocities along the entire length of the transfer line, since it would imply a much higher absolute pressure drop. This benefit of the invention is particularly useful in the case where the flow separation is performed by a solids concentrator, so that the downstream solids content is very high.

The total pressure drop between the first and second reactors is typically between 1 and 2 bar, although it is often desirable to minimise this. It is preferred that 40-80% of the total pressure drop between the first and second reactors occurs between the first reactor and the flow separation, with the remaining 20-60% occurring between the flow separation and the downstream vessel. Thus it is preferred that the pressure drop per unit length is greater downstream of the flow separation than upstream. The absolute pressure drop downstream of the flow separation is preferably less than 1 bar. This may be achieved by changing the geometry of the transfer line downstream of the flow separation.

In the case where the slurry contains more than 30 vol % solids, it is preferred that the transfer line is arranged such that the ratio of the pressure drop across the transfer line at production rates P1 and P2, dP1/dP2 (where dP1 is the pressure drop at production rate P1 and dP2 is the pressure drop at production rate P2, and P1 is greater than P2) is less than $(P1/P2)^2$, preferably no more than the P1/P2, and most preferably no more than 1.5.

One of the major benefits of the present invention is to enable the use of longer transfer lines between reactors. The total length of the transfer line between the two reactors may be between 5 m and 500 m, but lengths of 20 m to 200 m are more typical, and the most preferred length is less than 100 m. Preferably the length of the transfer line downstream of the flow separation is no more than 20 m, preferably no more than 10 m, and most preferably no more than 5 m.

Optionally both the transfer line and recycle line may be cooled. This can assist in controlling any polymerisation taking place.

In a third aspect, the invention provides a process for transferring a first slurry stream containing polymer through a transfer line from a polymerisation reactor to a downstream vessel, wherein prior to entry into the downstream vessel a second slurry stream which has been recycled from downstream is introduced into the first slurry stream, the second slurry introduction being located less than halfway along the transfer line between the reactor and the point of recycling downstream.

The second slurry stream is preferably drawn from the downstream vessel itself, in which case the point of recycling downstream is the downstream vessel, and the length of line between the second slurry introduction and the point of recycling downstream is thus the length between the second slurry introduction and the downstream vessel. Alternatively, the second slurry stream can be withdrawn downstream from the transfer line itself, in which case the length of line between the second slurry introduction and the point of recycling downstream is calculated from that downstream withdrawal point. It is possible that the second slurry stream is sourced from both locations, in which case the relevant length for the invention is the distance between the second slurry introduction and the downstream withdrawal point.

It is preferred that the length of the transfer line between the first reactor and the location of the second slurry introduction (ie upstream of the location of the second slurry introduction) is less than half, preferably less than a quarter, and most preferably less than a tenth, of that between the point of recycling downstream and the second slurry introduction.

This aspect of the invention has a related advantage to the first aspect in that by varying of the amount of recycled slurry introduced at the second slurry introduction, the flow rate downstream of the second slurry introduction can be maintained relatively constant, despite any variation in the flow rate upstream of the flow separation. Thus for example, if the output from the upstream polymerisation reactor decreases, a corresponding increase in the second slurry stream could ensure that the downstream flowrate entering the downstream vessel remains relatively constant. Accordingly in a preferred embodiment of the invention, the flowrate downstream of the second slurry introduction does not vary by more than 50%. It is also preferred that the pressure drop between the second slurry introduction and the downstream vessel does not vary by more than 30%.

Whilst it is possible to drive the recycle loop of the second slurry stream using the pressure drop across a downstream reactor loop circulation pump (in the case where the downstream vessel is a loop reactor), it is preferred that one or both of the upstream and downstream recycle loops have dedicated pumps.

It is important that the velocity of the slurry in the transfer line is above the minimum settling velocity for the slurry. Preferably the velocity of the slurry in the transfer line downstream of the second slurry introduction is from 2 to 30 ms$^{-1}$, and more preferably from 5 to 15 ms$^{-1}$.

Preferably the length of the transfer line upstream of the second slurry introduction is no more than 20 m, preferably no more than 10 m, and most preferably no more than 5 m. Preferably the pressure drop in this section of line is less than 1 bar and/or the velocity is preferably between 10 and 100 ms$^{-1}$, most preferably between 15 and 40 ms$^{-1}$.

We have also found that the risk of fouling or plugging in the transfer line increases with the length of the line, and therefore it is preferred to minimise the length of the line.

A fourth aspect of the invention is similar to a combination of features of the first aspect of the invention and features of the third aspect of the invention: downstream of a flow separation as in the first aspect of the invention, a second slurry stream which has been recycled from downstream is introduced into the first slurry stream as in the third aspect of the invention. Accordingly the fourth aspect of the invention provides a process for transferring a slurry stream containing polymer through a transfer line from a polymerisation reactor to a downstream vessel, wherein prior to entry into the downstream vessel the slurry stream is separated into two flows, the first flow being recycled upstream of the flow separation via a recycle line and the second flow being passed into the downstream vessel, and a third slurry stream which has been recycled from downstream is introduced into the second flow prior to its entry into the downstream vessel.

As in previous aspects of the invention, the downstream vessel is preferably a second polymerisation reactor. It is preferred that the first flow is recycled upstream of the flow separation by being passed back into the first reactor, and it is also preferred that the third slurry stream is drawn from the downstream vessel itself.

As in the first aspect of the invention, a solids concentrator, usually a centrifugal solids concentrator and most preferably a hydrocyclone, may be located at the point in the transfer line where the slurry stream is separated into first and second flows.

In one embodiment of all aspects of the invention, part or all of the transfer and/or the recycle line(s) is cooled, preferably by means of a cooling medium such as water passing through jackets surrounding at least part of the line. This feature is useful if it is desirable to control the temperature in the line in order to control any continuing polymerisation which may occur, or if it is required to add additional cooling to that of the upstream reactor (as the cooled slurry in the transfer line may be recycled to the upstream reactor.

In another embodiment, a catalyst feed or feeds may be introduced into the transfer or recycle line. Injecting catalyst outside the reactor minimises the risk of plugging or agglomeration at or near the injection point, particularly if the line at that point is cooled to below the temperature of the main reaction zone(s), or in the case when a solids concentrator is employed, the injection point is in the solids-lean recycle stream.

In yet another embodiment, part or all of any of the reagent feeds, such as the principal monomer feed, to one or all the reactors is introduced into the transfer or recycle line. Introducing reagents outside the reactor(s) permits enhanced dispersion of the reagents into the closed reaction loop, and minimises potential for plugging or agglomeration at or near the feed point for the same reasons as outlined above in respect of catalyst injection.

BRIEF DESCRIPTION OF THE DRAWINGS

Preferred embodiments of the various aspects of the invention are shown in more detail in the drawings.

Figure 1:
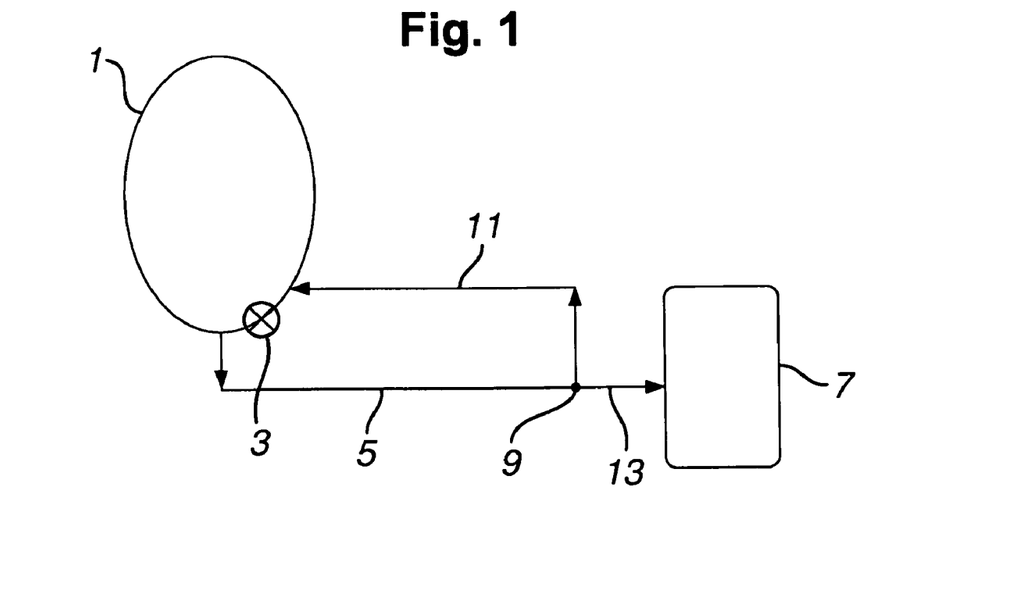

The first aspect of the invention is shown in FIG. 1. A loop reactor 1 having a pump 3 produces a polymer-containing slurry stream which is drawn off through a transfer line 5 to be passed into a downstream vessel 7, which is usually a further loop reactor. The flow of the slurry stream along the transfer line is separated at point 9, from where part of the stream is recycled via line 11 back into the reactor 1, upstream of the pump 3, and the remainder of the stream continues through line 13 into the downstream vessel 7. A key part of the invention is the positioning of point 9 along the transfer line 5. It is preferred that point 9 is located such that line 5 is significantly longer than line 13. Optionally a hydrocyclone may be located at point 9, such that the concentrated flow passes through line 13 to downstream vessel 7, and the diluent overflow is recycled via line 11.

Figure 2:
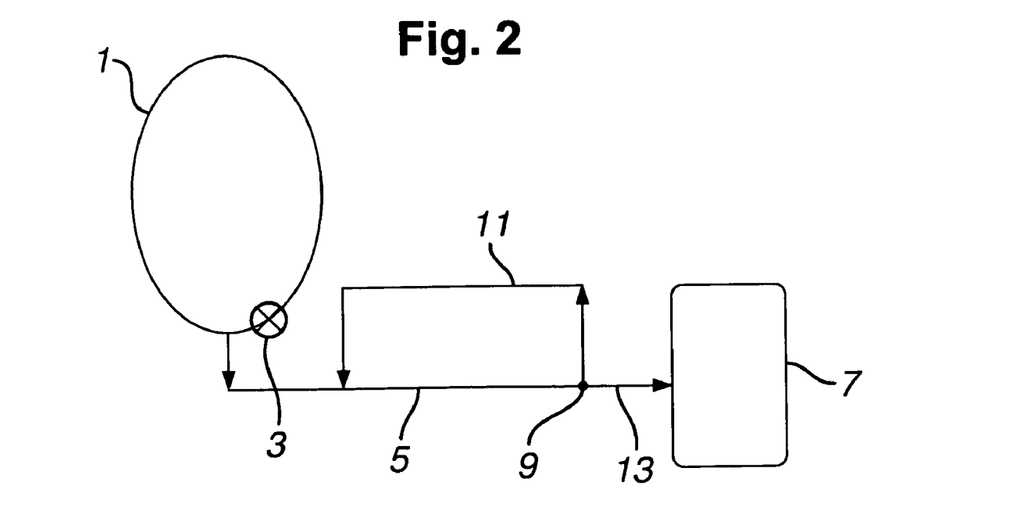

FIG. 2 shows a variation on the first aspect of the invention, in which recycle line 11 is returned into line 5 instead of being connected back to the reactor 1.

Figure 3:
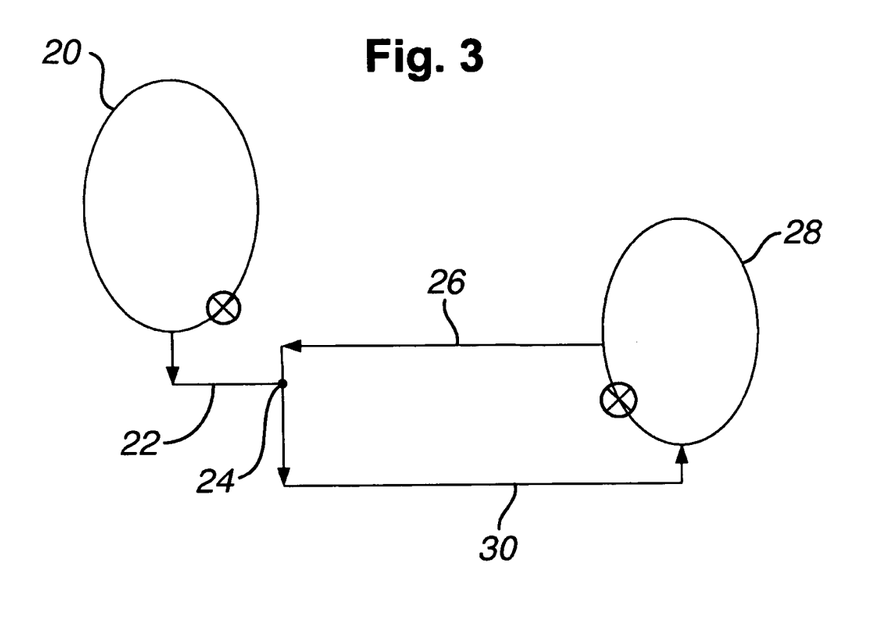

FIG. 3 shows an alternative further aspect of the invention in which prior to entry into the downstream vessel a second slurry stream which has been recycled from downstream is introduced into the first slurry stream. In the case illustrated in FIG. 3, the first slurry stream exits polymerisation reactor 20 via line transfer line 22, which is joined at point 24 by a further line 26 containing a further polymer-containing slurry stream which has been recycled from upstream. In this case, the further stream has been recycled from the downstream vessel 28, which is a second polymerisation reactor. The merged streams continue down line 30 to the second reactor 28. In this aspect of the invention, it is preferred that point 24 is located such that line 30 is significantly longer than line 22.

Figure 4:
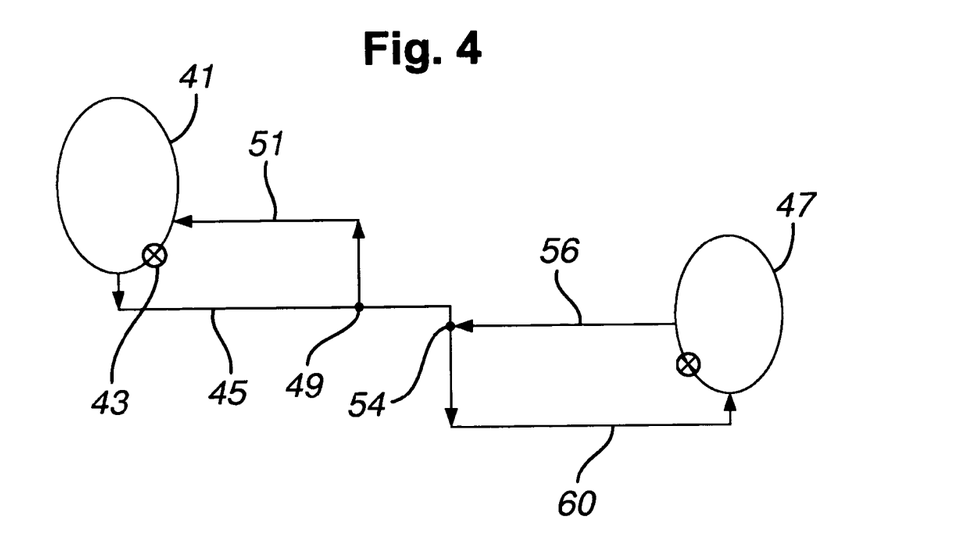

FIG. 4 shows the fourth aspect of the invention which combines the concept of flow separation shown in FIG. 1 with the concept of flow introduction shown in FIG. 3. A loop reactor 41 having a pump 43 produces a polymer-containing slurry stream which is drawn off through a transfer line 45 to be passed into a downstream vessel 47, which is a further polymerisation loop reactor. The flow of the slurry stream along the transfer line is separated at point 49, from where part of the stream is recycled via line 51 back into the first reactor 41 upstream of the pump 43, and the remainder of the stream continues through line 43 towards the downstream reactor 47. Downstream of point 49, line 45 is joined at point 54 by a further line 56 containing a further polymer-containing slurry stream which has been recycled from upstream. In this case, the further stream has been recycled from the downstream vessel 47. The merged streams continue down line 60 to the second reactor 47. It should be noted that in this aspect of the invention, the location of points 49 and 54 is less significant than in FIGS. 1 and 3.

DETAILED DESCRIPTION OF PREFRRED EMBODIMENTS

All aspects of the invention are particularly applicable to the continuous polymerization of olefins, preferably alpha mono olefins, in an elongated tubular closed loop reaction zone. The olefin(s) is continuously added to, and contacted with, a catalyst in a hydrocarbon diluent. The monomer(s) polymerise to form a slurry of solid particulate polymer suspended in the polymerisation medium or diluent.

Typically, in the slurry polymerisation process of polyethylene, the slurry in the reactor will comprise the particulate polymer, the hydrocarbon diluent(s), (co) monomer(s), catalyst, chain terminators such as hydrogen and other reactor additives In particular the slurry will comprise 20-75, preferably 30-70 weight percent based on the total weight of the slurry of particulate polymer and 80-25, preferably 70-30 weight percent based on the total weight of the slurry of suspending medium, where the suspending medium is the sum of all the fluid components in the reactor and will comprise the diluent, olefin monomer and any additives; the diluent can be an inert diluent or it can be a reactive diluent in particular a liquid olefin monomer; where the principal diluent is an inert diluent the olefin monomer will typically comprise 2-20, preferably 4-10 weight percent of the slurry.

The slurry is pumped around the relatively smooth path-endless loop reaction system at fluid velocities sufficient (i) to maintain the polymer in suspension in the slurry and (ii) to maintain acceptable cross-sectional concentration and solids loading gradients.

Reactor size is typically over 10 m$^3$, usually over 25 m$^3$ in particular over 50 m$^3$ for example 75-200 m$^3$ preferably in the range 100-175 m$^3$ In these and other embodiments of the present invention comprising a multiple reactor system wherein at least the first of the reactors is a loop reactor, the loop reactor may have one or more characteristics of the loop reactor as set out hereinabove. The second reactor may be another loop reactor or any reactor for the polymerisation of olefins, for example a fluidised-bed reactor. However, it is preferable that the second reactor is another loop reactor.

The multiple reactor system can be used to make monomodal or multimodal, preferably multimodal polymers.

In one embodiment of the invention, the polymer is a multimodal ethylene polymer having a density greater than 940 kg/m$^3$ and a melt flow index MI$_5$ of 0.05 to 50 g/10 min, said ethylene polymer comprising:

from 30 to 70 wt %, based on the total weight of the ethylene polymer, of a first polyethylene fraction having a density of at least 950 kg/m$^3$ and a melt flow index MI$_2$ of at least 10 g/10 min, and from 70 to 30 wt %, based on the total weight of the multimodal ethylene polymer, of a second polyethylene fraction comprising units of ethylene and optionally up to 5 mol % of at least one other alpha-olefin containing from 3 to 12 carbon atoms, and a melt flow index MI$_2$ of less than 10 g/10 min.

An alternative polymer is a multimodal ethylene polymer having a density between 900 and 930 kg/m$^3$ and a melt flow index MI$_2$ of 0.1 to 20 g/10 min, said ethylene polymer comprising:

from 30 to 70 wt %, based on the total weight of the ethylene polymer, of a first polyethylene fraction having a density of less than 950 kg/m$^3$ and a melt flow index MI$_2$ of at least 10 g/10 min, and from 70 to 30 wt %, based on the total weight of the multimodal ethylene polymer, of a second polyethylene fraction comprising units of ethylene, from 0.1 to 20 mol % of an alpha-olefin containing from 3 to 12 carbon atoms, and a melt flow index MI$_2$ of less than 10 g/10 min.

The pressure employed in the loop, or loops will be sufficient to maintain the reaction system 'liquid full' i.e. there is substantially no gas phase. Typical pressures used are between 1-100 bara, preferably between 30 to 50 bara. In ethylene polymerization the ethylene partial pressure will typically be in the range 0.1 to 5 MPa, preferably from 0.2 to 2 MPa, more particularly from 0.4 to 1.5 MPa. The temperatures selected are such that substantially all of the polymer produced is essentially (i) in a non-tacky and non-agglomerative solid particular form and (ii) almost insoluble in the diluent. The polymerization temperature depends on the hydrocarbon diluent chosen and the polymer being produced. In ethylene polymerisation the temperature is generally below 130° C., typically between 50 and 125° C., preferably between 75 and 115° C. For example in ethylene polymerisation in isobutane diluent, the pressure employed in the loop is preferably in the range 30-50 bara, the ethylene partial pressure is preferably in the range 0.2-2 MPa and the polymerisation temperature is in the range 75-115° C. The space time yield which is production rate of polymer per unit of loop reactor volume for the process of the present invention is in the range 0.1-0.4 preferably 0.2-0.35 tonne/hour/m$^3$. Where there are two or more loops, the reaction conditions may be the same or different in different loops.

The polymerisation reactions to which the present invention is relevant include the preparation of compositions containing olefin (preferably ethylene) polymers which can comprise one or a number of olefin homo-polymers and/or one or a number of copolymers. It is particularly suited to the manufacture of ethylene polymers and propylene polymers. Ethylene copolymers typically comprise an alpha-olefin in a variable amount which can reach 12% by weight, preferably from 0.5 to 6% by weight, for example approximately 1% by weight.

The alpha mono-olefin monomers generally employed in such reactions are one or more 1-olefins having up to 8 carbon atoms per molecule and no branching nearer the double bond than the 4-position. Typical examples include ethylene, propylene, butene-1, pentene-1, hexene-1 and octene-1, and mixtures such as ethylene and butene-1 or ethylene and hexene-1. Butene-1, pentene-1 and hexene-1 are particularly preferred comonomers for ethylene copolymerisation.

Typical diluents employed in such reactions include hydrocarbons having 2 to 12, preferably 3 to 8, carbon atoms per molecule, for example linear alkanes such as propane, n-butane, n-hexane and n-heptane, or branched alkanes such as isobutane, isopentane, isooctane and 2,2,-dimethylpropane, or cycloalkanes such as cyclopentane and cyclohexane or their mixtures. In the case of ethylene polymerization, the diluent is generally inert with respect to the catalyst, cocatalyst and polymer produced (such as liquid aliphatic, cycloaliphatic and aromatic hydrocarbons), at a temperature such that at least 50% (preferably at least 70%) of the polymer formed is insoluble therein. Isobutane is particularly preferred as the diluent for ethylene polymerisation.

The operating conditions can also be such that the monomers (e.g. ethylene, propylene) act as the diluent as is the case in so called bulk polymerisation processes. The slurry concentration limits in volume percent have been found to be able to be applied independently of molecular weight of the diluent and whether the diluent is inert or reactive, liquid or supercritical. Propylene monomer is particularly preferred as the diluent for propylene polymerisation.

In commercial plants, the particulate polymer is separated from the diluent in a manner such that the diluent is not exposed to contamination so as to permit recycle of the diluent to the polymerization zone with minimal if any purification. Separating the particulate polymer produced by the process of the present invention from the diluent typically can be by any method known in the art for example it can involve either (i) the use of discontinuous vertical settling legs such that the flow of slurry across the opening thereof provides a zone where the polymer particles can settle to some extent from the diluent or (ii) continuous product withdrawal via a single or multiple withdrawal ports, the location of which can be anywhere on the loop reactor but is preferably adjacent to the downstream end of a horizontal section of the loop. Any continuous withdrawal ports will typically have an internal diameter in the range 2-25, preferably 4-15, especially 5-10 cm This invention permits large scale polymerisation reactors to be operated with low diluent recovery requirements. The operation of large diameter reactors with high solids concentrations in the slurry minimises the quantity of the principal diluent withdrawn from the polymerisation loop. Use of concentrating devices on the withdrawn polymer slurry, preferably hydrocylones (single or in the case of multiple hydrocyclones in parallel or series), further enhances the recovery of diluent in an energy efficient manner since significant pressure reduction and vaporisation of recovered diluent is avoided.

It has been found that the slurry concentration in the reactor loop can be optimised by controlling the average particle size and/or the particle size distribution of the powder within the reactor loop. The principal determinant of the average particle size of the powder is the residence time in the reactor. The particle size distribution of the powder can be affected by many factors including the particle size distribution of the catalyst fed to the reactor, the initial and average catalyst activity, the robustness of the catalyst support and susceptibility of the powder to fragment under reaction conditions. Solids separating devices (such as hydrocyclones) can be used on the slurry withdrawn from the reactor loop to further assist in control of the average particle size and the particle size distribution of the powder in the reactor. The location of the withdrawal point for the concentrating device and the design and operating conditions of the concentrating device system, preferably the at least one hydrocyclone recycle loop, also enables the particle size and particle size distribution within the reactor to be controlled. The average particle size is preferably between 100 and 1500 microns, most preferably between 250 and 1000 microns.

Where the final reactor of the multiple reactor system is a loop reactor, the withdrawn, and preferably concentrated, polymer slurry is depressurised, and optionally heated, prior to introduction into a primary flash vessel. The stream is preferably heated after depressurisation.

The diluent and any monomer vapours recovered in the primary flash vessel are typically condensed, preferably without recompression and reused in the polymerization process. The pressure of the primary flash vessel is preferably controlled to enable condensation with a readily available cooling medium (e.g. cooling water) of essentially all of the flash vapour prior to any recompression, typically such pressure in said primary flash vessel will be 4-25 for example 10-20, preferably 15-17 bara. The solids recovered from the primary flash vessel is preferably passed to a secondary flash vessel to remove residual volatiles. Alternatively the slurry may be passed to a flash vessel of lower pressure than in the above mentioned primary vessel such that recompression is needed to condense the recovered diluent. Use of a high pressure flash vessel is preferred.

The process according to the invention is relevant to all olefin polymerisation catalyst systems, particularly those chosen from the Ziegler-type catalysts, in particular those derived from titanium, zirconium or vanadium and from thermally activated silica or inorganic supported chromium oxide catalysts and from metallocene-type catalysts, metallocene being a cyclopentadienyl derivative of a transition metal, in particular of titanium or zirconium.

Non-limiting examples of Ziegler-type catalysts are the compounds comprising a transition metal chosen from groups IIIB, IVB, VB or VIB of the periodic table, magnesium and a halogen obtained by mixing a magnesium compound with a compound of the transition metal and a halogenated compound. The halogen can optionally form an integral part of the magnesium compound or of the transition metal compound.

Metallocene-type catalysts may be metallocenes activated by either an alumoxane or by an ionising agent as described, for example, in Patent Application EP-500,944-A1 (Mitsui Toatsu Chemicals).

Ziegler-type catalysts are most preferred. Among these, particular examples include at least one transition metal chosen from groups IIIB, IVB, VB and VIB, magnesium and at least one halogen. Good results are obtained with those comprising:

from 10 to 30% by weight of transition metal, preferably from 15 to 20% by weight, from 20 to 60% by weight of halogen, preferably from 30 to 50% by weight from 0.5 to 20% by weight of magnesium, usually from 1 to 10% by weight, from 0.1 to 10% by weight of aluminum, generally from 0.5 to 5% by weight, the balance generally consists of elements arising from the products used for their manufacture, such as carbon, hydrogen and oxygen. The transition metal and the halogen are preferably titanium and chlorine.

Polymerisations, particularly Ziegler catalysed ones, are typically carried out in the presence of a cocatalyst. It is possible to use any cocatalyst known in the art, especially compounds comprising at least one aluminium-carbon chemical bond, such as optionally halogenated organoaluminium compounds, which can comprise oxygen or an element from group I of the periodic table, and aluminoxanes. Particular examples would be organoaluminium compounds, of trialkylaluminiums such as triethylaluminium, trialkenylaluminiums such as triisopropenylaluminium, aluminium mono- and dialkoxides such as diethylaluminium ethoxide, mono- and dihalogenated alkylaluminiums such as diethylaluminium chloride, alkylaluminium mono- and dihydrides such as dibutylaluminium hydride and organoaluminium compounds comprising lithium such as $LiAl(C_2H_5)_4$. Organoaluminium compounds, especially those which are not halogenated, are well suited. Triethylaluminium and triisobutylaluminium are especially advantageous.

The chromium-based catalyst is preferred to comprise a supported chromium oxide catalyst having a titania-containing support, for example a composite silica and titania support. A particularly preferred chromium-based catalyst may comprise from 0.5 to 5 wt % chromium, preferably around 1 wt % chromium, such as 0.9 wt % chromium based on the weight of the chromium-containing catalyst. The support comprises at least 2 wt % titanium, preferably around 2 to 3 wt % titanium, more preferably around 2.3 wt % titanium based on the weight of the chromium containing catalyst. The chromium-based catalyst may have a specific surface area of from 200 to 700 $m^2/g$, preferably from 400 to 550 $m^2/g$ and a volume porosity of greater than 2 $cm^3/g$ preferably from 2 to 3 $cm^3/g$.

Silica supported chromium catalysts are typically subjected to an initial activation step in air at an elevated activation temperature. The activation temperature preferably ranges from 500 to 850° C., more preferably 600 to 750° C.

EXAMPLES

The examples below are based on the arrangement shown in FIG. 1, in which a polymer-containing slurry is discharged from a reactor having a production rate of between 8000 kg/h and 20000 kg/h, a solids concentration of between 25 wt % and 47 wt %, and a slurry density of 446 $kg/m^3$. The conditions are given in Table 1 below: line 5 is prior to the flow separation, line 13 is after the flow separation, and line 11 is the recycle line back to the reactor. The line between the reactor and the downstream vessel is 60 m long. In Examples 1 to 4, the flow separation is 86% along the length of the line.

In Example 5 the separation is 57% along the length of the line, and in Example 6 (comparative) it is 37% along the length of the line.

Example 1 may be considered to be a reference case. Examples 2, 3 and 4 demonstrate the considerable flexibility of the present invention; with the flow separation in the same position, it is possible to operate over a large range of production rates and solids contents. Example 5 demonstrates a separation point further from the downstream vessel. Example 6 is a comparative Example, where the flow separation is less than halfway along the line.

TABLE 1

|  |  | EXAMPLE | | | | | |
| --- | --- | --- | --- | --- | --- | --- | --- |
|  |  | 1 | 2 | 3 | 4 | 5 | 6 (comp) |
| Production rate | kg/h | 10000 | 20000 | 8000 | 15000 | 10000 | 10000 |
| Solids content | wt % | 40 | 40 | 25 | 47 | 40 | 40 |
| Flowrate line 5 | kg/h | 75426 | 91195 | 77479 | 56106 | 75426 | 75426 |
| Flowrate line 11 | kg/h | 50426 | 41195 | 45479 | 24191 | 50426 | 50426 |
| Flowrate line 13 | kg/h | 25000 | 50000 | 32000 | 31915 | 25000 | 25000 |
| Velocity line 13 | m/s | 6.26 | 12.53 | 8.82 | 7.62 | 6.26 | 6.26 |
| Position of separation | % | 86 | 86 | 86 | 86 | 56 | 38 |
| Pressure drop line 13 | bar | 0.14 | 0.57 | 0.26 | 0.22 | 0.72 | 1.44 |
| Total line length | m | 60 | 60 | 60 | 60 | 60 | 60 |

Comparative Example 6 can be compared directly with Examples 1 and 5, all three of which operate at the same production rate and solids content, with the same mass flowrates in the three lines, and with the same velocity in line 13. The only difference is the location of the flow separation, which means that in the case of Example 6 the potential for fouling or sedimentation to occur is much greater than in the other two cases. It should also be noted that the pressure drop along line 13 in Example 6 is undesirable because it is greater than 1 bar, whereas it is less than 1 bar in Examples 1 and 5.

The invention claimed is:

1. Process for transferring a slurry stream containing polymer through a transfer line from a polymerisation reactor to a downstream vessel, comprising prior to entry into the downstream vessel separating the slurry stream into two flows, the first flow being recycled upstream of the flow separation and the second flow being passed into the downstream vessel, wherein the flow separation is located more than halfway along the transfer line between the reactor and the downstream vessel.

2. Process according to claim 1, wherein the downstream vessel is a second polymerisation reactor.

3. Process according to claim 1, wherein the length of the transfer line between the first reactor and the location of the flow separation is at least twice that between the downstream vessel and the location of the flow separation.

4. Process according to claim 1, wherein the average flowrate over any 5 minute period upstream of the flow separation varies by less than 50% in any 4 hour period.

5. Process according claim 1, wherein the average pressure drop over any 5 minute period between the first polymerisation reactor and the flow separation varies by less than 30% in any 4 hour period.

6. Process according to claim 1, wherein part or all of the first flow is recycled back into the transfer line upstream of the flow separation to form a recycle loop.

7. Process according to claim 1, wherein the first flow is recycled upstream of the flow separation back into the first reactor.

8. Process according to claim 1, wherein a solids concentrator is located at the point of flow separation in the transfer line.

9. Process according to claim 8, wherein the solids concentrator is a hydrocyclone, and the flow into the downstream vessel constitutes the concentrated base flow from the hydrocyclone, and the recycled flow upstream constitutes the overhead diluent-rich flow from the hydrocyclone.

10. Process for transferring a first slurry stream containing polymer through a transfer line from a polymerisation reactor to a downstream vessel, wherein prior to entry into the downstream vessel a second slurry stream which has been recycled from downstream is introduced into the first slurry stream, the second slurry introduction being located less than halfway along the transfer line between the reactor and the point of recycling downstream.

11. Process according to claim 10, wherein the second slurry stream is drawn from the downstream vessel itself and/or from the transfer line.

12. Process according to claim 10, wherein the length of the transfer line between the first reactor and the location of the second slurry introduction is less than half of that between the point of recycling downstream and the second slurry introduction.

13. Process for transferring a slurry stream containing polymer through a transfer line from a polymerisation reactor to a downstream vessel, comprising prior to entry into the downstream vessel separating the slurry stream into two flows, the first flow being recycled upstream of the flow separation via a recycle line and the second flow being passed into the downstream vessel, and a third slurry stream which has been recycled from downstream is introduced into the second flow prior to its entry into the downstream vessel.

14. Process according to claim 10, wherein a catalyst feed or feeds, and/or part or all of any of the reagent feeds to one or all the reactors, is introduced into the transfer or recycle line.

15. Process for transferring a slurry stream containing polymer and reagents through a transfer line from a first polymerisation reactor to a downstream vessel, comprising prior to entry into the downstream vessel maintaining the slurry stream under polymerisation conditions so as to reduce the concentration of at least one of the reagents present in the stream by at least 50 mol % whilst increasing the mass of the polymer present in the stream by no more than 5 wt % prior to introduction into the downstream vessel.

16. Process according to claim 3, wherein the length of the transfer line between the first reactor and the location of the flow separation is at least four times that between the downstream vessel and the location of the flow separation.

17. Process according to claim 3, wherein the length of the transfer line between the first reactor and the location of the flow separation is at least ten times that between the downstream vessel and the location of the flow separation.

18. Process according to claim 4, wherein the average flowrate over any 5 minute period upstream of the flow separation varies by less than 10% in any 4 hour period.

19. Process according to claim 4, wherein the average flowrate over any 5 minute period upstream of the flow separation varies by less than 50% in any 12 hour period.

20. Process according to claim 4, wherein the average flowrate over any 5 minute period upstream of the flow separation varies by less than 10% in any 12 hour period.

21. Process according to claim 5, wherein the average pressure drop over any 5 minute period between the first polymerisation reactor and the flow separation varies by less than 15% in any 4 hour period.

22. Process according to claim 5, wherein the average pressure drop over any 5 minute period between the first polymerisation reactor and the flow separation varies by less than 30% in any 12 hour period.

23. Process according to claim 5, wherein the average pressure drop over any 5 minute period between the first polymerisation reactor and the flow separation varies by less than 15% in any 12 hour period.

24. Process according to claim 12, wherein the length of the transfer line between the first reactor and the location of the second slurry introduction is less than a quarter of that between the point of recycling downstream and the second slurry introduction.

25. Process according to claim 12, wherein the length of the transfer line between the first reactor and the location of the second slurry introduction is less than a tenth of that between the point of recycling downstream and the second slurry introduction.

26. Process according to claim 15 wherein the concentration of at least one of the reagents present in the stream is reduced by at least 90 mol % whilst increasing the mass of the polymer present in the stream by no more than 1 wt % prior to introduction into the downstream vessel.

27. Process according to claim 15 wherein the downstream vessel is a polymerisation vessel.

* * * * *